United States Patent Office 2,824,102
Patented Feb. 18, 1958

2,824,102

AMINOALKYL-2H,1,4-BENZOTHIAZIN-3(4H)-ONES

Markus Zimmermann, Riehen, Switzerland, assignor to G. D. Searle & Co., Chicago, Ill., a corporation of Delaware No Drawing. Application September 13, 1956
Serial No. 609,542

6 Claims. (Cl. 260—243)

This invention relates to amino alkyl derivatives of 2H,1,4-benzothiazin-3(4H)-one and processes for the manufacture thereof. More particularly, this invention relates to aminoalkyl derivatives as aforesaid and having the formula

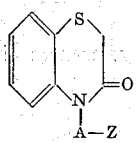

wherein Z represents a nitrogen-containing heterocyclic aliphatic radical such as pyrrolidino, piperidino, morpholino, piperazino and the like, or an amino radical which may be substituted by as many as two aliphatic radicals, and A is a lower alkylene radical containing at least two carbon atoms.

The compounds of the invention are prepared by reacting an alkali metal salt of 2H,1,4-benzothiazin-3(4)-one with the appropriate aminoalkyl halide. The reaction is conveniently carried out using an inert diluent such as benzene, toluene, xylene, hexane and the like at an elevated temperature. After completion of the reaction, the mixture is made alkaline and extracted with a water-immiscible solvent such as ether or the like and, after removal of the solvent, distilled at reduced pressure. The product thus obtained is in the form of a base. Acid addition salts may be made therefrom by treating a solution of the base in a suitable solvent such as ethanol, isopropanol or the like with an acid such as the hydrohalogen acids, sulfuric acid, acetic acid, citric acid, tartaric acid, benzoic acid and the like, and recovering the product.

Suitable alkali metal derivatives of 2H,1,4-benzothiazin-3(4)-one are those prepared with lithium, sodium or potassium. Suitable aminoalkyl halides are di(lower)-alkylamino(lower)alkyl halides such as diethylaminoethyl chloride or bromide, γ-dimethylaminopropyl chloride or bromide, diisopropylaminoethyl chloride or bromide or nitrogen containing cycloaliphatic alkyl halides such as piperidinoethyl chloride, pyrrolidinoethyl chloride, morpholinoethyl chloride, the corresponding bromides and the like.

The compounds of this invention are valuable because of their bactericidal activity against gram positive and gram negative microorganisms, for example E. coli and B. subtilis. Solutions of the compounds in alcohol (applied topically) are useful for the disinfection of cuts and abrasions of the skin.

The invention is illustrated in greater detail in the following examples which are presented by way of illustration and not of limitation. Temperatures are expressed in degrees centigrade. Parts by weight bear the same relation to parts by volume as do kilograms to liters.

Example 1

4.95 parts by weight of 2H,1,4-benzothiazin-3(4H)-one is converted to the lithium derivative by adding a solution of butyllithium in ether until the solution changes in color from colorless to yellow. The above operation is carried out under nitrogen, while stirring and cooling. To the lithium derivative thus prepared, a solution of 5.5 parts by weight of diethylaminoethyl chloride in 20 parts by volume of ether is added and the mixture stirred at room temperature for 2 hours. 30 parts by volume of dry benzene is added and the mixture refluxed overnight. The mixture is then extracted with aqueous hydrochloric acid, the acid extract made alkaline with sodium carbonate and the alkaline solution extracted with ether. The ether extract is dried with anhydrous sodium sulfate and distilled in a short path distillation apparatus at a bath temperature of 130–135° and a pressure of 0.05 mm. to yield 4-(β-diethylaminoethyl)-2H,1,4-benzothiazin-3(4H)-one.

By substituting 6.2 parts by weight of γ-dimethylaminopropyl chloride for the diethylaminoethyl chloride, there is obtained 4-(γ-dimethylaminopropyl) - 2H,1,4 - benzothiazin-3(4H)-one which is distilled at a pressure of 0.05 mm. and a bath temperature of 140° C.

The hydrochlorides are prepared by dissolving the base in isopropanol and adding an excess of isopropanolic hydrogen chloride followed by the addition of ethyl acetate to turbidity. After standing the crystalline salt is filtered off.

Example 2

3.3 parts by weight of 2H,1,4-benzothiazin-3(4H)-one is suspended in about 20 parts by volume of dry toluene. To this mixture is added 0.46 part by weight of sodium in small pieces and the mixture refluxed with stirring for about 20 hours during which time a copious white precipitate of the sodium derivative forms. The mixture is cooled in an ice bath and a solution of 5 parts by weight of β-diisopropylaminoethyl chloride added and the mixture stirred at room temperature for 2 hours. The mixture is decanted from unreacted sodium and then refluxed for an additional 6 hours. The mixture is cooled, diluted with ether, extracted with hydrochloric acid solution, the acid extract made alkaline with sodium carbonate solution and the alkaline solution extracted with ether. The ether extract is dried, the ether removed by distillation and the residue is distilled at 0.05 mm. at a bath temperature of 145° to yield 4-(β-diisopropylaminoethyl)-2H,1,4-benzothiazin-3(4H)-one.

Example 3

To the ether solution of the lithium derivative prepared from 4.95 parts by weight of 2H,1,4-benzothiazin-3(4H)-one is added 7.5 parts by weight of morpholinoethyl chloride in 20 parts by volume of ether and the mixture stirred at room temperature for 2½ hours. 35 parts by volume of dry benzene is added and the mixture refluxed for 5 hours. After cooling, the mixture is extracted with dilute aqueous hydrochloric acid, the acid extract made alkaline with sodium carbonate and the alkaline solution extracted with ether. The ether extract is dried over anhydrous sodium sulfate and distilled in a short path distillation apparatus at 0.04 mm. pressure and a bath temperature of 140–145° to yield 4-(β-morpholinoethyl)-2H,1,4-benzothiazin-3(4H)-one.

By substituting 7.5 parts by weight of piperidinoethyl chloride for the morpholinoethyl chloride used above and distilling at a bath temperature of 170° and 0.1 mm. pressure there is obtained 4-(β-piperidinoethyl)-2H,1,4-benzothiazin-3(4H)-one.

By substituting 7.0 parts by weight of pyrrolidinoethyl chloride for the morpholinoethyl chloride and distilling at a bath temperature of 165° and a pressure of 0.09 mm. there is obtained 4-(β-pyrrolidinoethyl)-2H,1,4-benzothiazin-3(4H)-one.

What is claimed is:
1. A compound selected from the group consisting of compounds having the formula

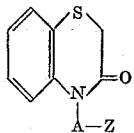

and pharmaceutically acceptable acid addition salts thereof wherein Z is selected from the group consisting of pyrrolidino, piperidino, morpholino, and di(lower)alkylamino radicals, and A is lower alkylene containing at least two carbons.

2. A compound of the formula

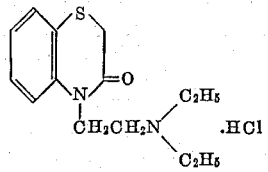

3. A compound of the formula

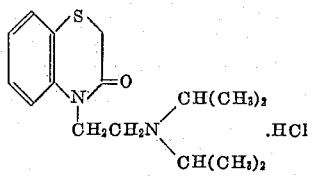

4. A compound of the formula

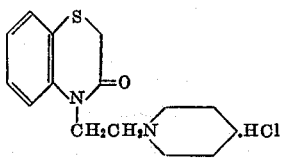

5. A compound of the formula

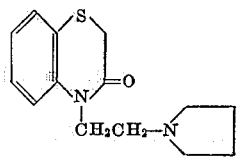

6. A compound of the formula

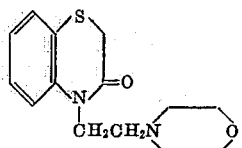

No references cited.